(12) United States Patent
Wan et al.

(10) Patent No.: US 12,287,541 B2
(45) Date of Patent: Apr. 29, 2025

(54) SUB-DISPLAY SCREEN, ASSEMBLED SCREEN, AND DISPLAY DEVICE

(71) Applicants: CHONGQING HKC OPTOELECTRONIS TECHNOLOGY CO., LTD., Chongqing (CN); HKC CORPORATION LIMITED, Shenzhen (CN)

(72) Inventors: Ye Wan, Chongqing (CN); Haijiang Yuan, Chongqing (CN)

(73) Assignees: CHONGQING HKC OPTOELECTRONICS TECHNOLOGY CO., LTD., Chongqing (CN); HKC CORPORATION LIMITED, Shenzhen (CN)

( * ) Notice: Subject to any disclaimer, the term of this patent is extended or adjusted under 35 U.S.C. 154(b) by 185 days.

(21) Appl. No.: 18/078,002

(22) Filed: Dec. 8, 2022

(65) Prior Publication Data
US 2023/0186796 A1 Jun. 15, 2023

(30) Foreign Application Priority Data
Dec. 13, 2021 (CN) .......................... 202111514268.3

(51) Int. Cl.
G02F 1/1333 (2006.01)
G06F 1/16 (2006.01)
G09F 9/302 (2006.01)

(52) U.S. Cl.
CPC ........ *G02F 1/13336* (2013.01); *G06F 1/1637* (2013.01); *G09F 9/3026* (2013.01); *G09G 2300/026* (2013.01)

(58) Field of Classification Search
CPC ................ G06F 3/1446; G06F 1/1637; G09G 2300/026; G09F 9/3026; H05K 5/30; G02F 1/133308; G02F 1/13336; G02F 1/133322; G02F 1/13332; G02F 1/133317
See application file for complete search history.

(56) References Cited

U.S. PATENT DOCUMENTS

| | | | | |
|---|---|---|---|---|
| 5,867,236 A * | 2/1999 | Babuka | ..................... | G09G 3/20 349/190 |
| 5,995,179 A * | 11/1999 | Tamura | ................. | G09F 9/3026 349/73 |
| 2011/0221995 A1* | 9/2011 | Park | ..................... | G02F 1/13336 349/58 |
| 2018/0124932 A1* | 5/2018 | Seo | ........................ | H05K 5/0017 |
| 2019/0316616 A1* | 10/2019 | Foster | ................... | G06F 3/1446 |

(Continued)

*Primary Examiner* — Nidhi Thaker

(57) ABSTRACT

A sub-display screen, an assembled screen, and a display device are disclosed. The sub-display screen includes a display panel and a fixing piece. The fixing piece is disposed below the display panel for supporting the display panel. A seam region is formed between the fixing piece and the display panel. The sub-display screen further includes an assembling piece arranged in the seam region. A portion of the assembling piece is connected to the display panel and the fixing piece, and seals the gap between the display panel and the fixing piece. Another portion of the assembling piece protrudes from the side of the fixing piece away from the display panel to form a joining portion, and after the sub-display screens are assembled, the joining portions seal the seam regions.

13 Claims, 8 Drawing Sheets

(56) References Cited

U.S. PATENT DOCUMENTS

2020/0102977 A1\* 4/2020 Kim .................... F16M 11/041
2020/0103068 A1\* 4/2020 Ahn .................... F16M 11/043
2020/0271971 A1\* 8/2020 Su ....................... G02F 1/13336

\* cited by examiner

SUB-DISPLAY SCREEN, ASSEMBLED SCREEN, AND DISPLAY DEVICE

CROSS-REFERENCE TO RELATED APPLICATIONS

This application claims the priority and benefit of Chinese patent application 2021115142683, titled "Sub-display Screen, Assembled screen, and Display Device" and filed Dec. 13, 2021, with China National Intellectual Property Administration, the entire contents of which are incorporated herein by reference.

TECHNICAL FIELD

The present application relates to the field of display technology, and in particular, to a sub-display screen, an assembled screen, and a display device.

BACKGROUND

With the continuous progress of society and the continuous improvement of living standards, in most life scenarios, small-sized display screens can no longer meet people's needs. Meanwhile, an assembled screen that can be used as a display alone or can be assembled in multiple into a large screen is becoming more and more popular.

Nowadays, most of the assembled screens are simply composed by multiple display screens overlapping each other, and the seams between the multiple display screens are large, which will cause the external dust to easily enter the interior of the display screen from the seams, making the electronic components inside the display screen dirty and difficult to clean. Long-term dust accumulation can also affect the display effect and the service life of the display.

Therefore, how to improve the joint sealing degree of the assembled screens and prevent dust from invading the interior of the assembled screens has become an urgent problem to be solved in the art.

SUMMARY

It is therefore a purpose of the present application to provide a sub-display screen, an assembled screen and a display device, which can prevent dust from contaminating the electronic devices inside the sub-display screens and improve the joint sealing degree between the sub-display screens.

The present application discloses a sub-display screen, including a display panel and a fixing piece. The fixing piece is arranged below the display panel for supporting the display panel. A seam region is formed between the fixing piece and the display panel. The sub-display screen further includes: an assembling piece. The assembling piece is arranged in the seam region. A portion of the assembling piece is connected to the display panel and the fixing piece, and seals the gap between the display panel and the fixing piece. Another portion protrudes from the side of the fixing piece away from the display panel to form a joining portion, and after the sub-display screens are assembled, the joining portions seal the seam region.

Optionally, the display panel includes a first substrate and a second substrate. The first substrate and the second substrate are aligned and bonded to form a cell. Apart of the first substrate protrudes from the second substrate to form a protruding portion. The fixing piece includes a rubber frame. The joining portion further includes a buffer portion and a support portion. One end of the support portion is connected with the buffer portion, and the other end is connected with the joining portion. The buffer portion is perpendicular to the support portion. The support portion is arranged between the protruding portion and the rubber frame. The side of the support portion away from the protruding portion is connected with the rubber frame. One end of the buffer portion is in contact with the protruding portion, and the other end extends into the gap between the second substrate and the rubber frame, and seals the gap.

Optionally, the joining portions of two adjacent sub-display screens are arranged correspondingly, and after the two adjacent sub-display screens are assembled, the joining portions of the two sub-display screens abut each other.

Optionally, the joining portions of two adjacent sub-display screens are misaligned and staggered, and after the two adjacent sub-display screens are assembled, the joining portions in the adjacent two sub-display screens are engaged and interlocked with each other.

Optionally, the side of the support portion away from the rubber frame abuts the protruding portion. The side of the support portion adjacent to the protruding portion, the side of the buffer portion abutting the protruding portion, and the side of the joining portion adjacent to the first substrate lie on the same plane.

Optionally, between the first substrate and the second substrate, a light shielding layer is disposed on the side adjacent to the protruding portion. A chamfer is disposed on the side of the protruding portion adjacent to the joining portion. The light-shielding layer covers the chamfer structure. The joining portion matches the shape of the chamfer, and the joining portion abuts the chamfer.

The present application further discloses an assembled screen, the assembled screen including a plurality of the above-mentioned sub-display screens. The assembled screen includes a first sub-display screen and a second sub-display screen. The first sub-display screen includes a first sub-substrate and a second sub-substrate. The first sub-substrate is arranged above the second sub-substrate. The second sub-display screen includes a third sub-substrate and a fourth sub-substrate. The third sub-substrate is arranged above the fourth sub-substrate. The second sub-substrate partially protrudes from the first sub-substrate to form a first protruding portion. The third sub-substrate partially protrudes from the fourth sub-substrate to form a second protruding portion. After the first sub-display screen and the second sub-display screen are assembled, the orthographic projections of the first protruding portion and the second protruding portion in the direction perpendicular to the second sub-display screen overlap. The assembling piece includes a first buffer portion, a second buffer portion, a first support portion and a first joining portion. The first buffer portion and the second buffer portion are respectively arranged at both ends of the first support portion and are perpendicular to the first support portion. The first joining portion is arranged between the first support portion and the third sub-substrate. The first joining portion is connected with both the second sub-substrate and the third sub-substrate. One end of the second buffer portion abuts the third sub-substrate, and the other end extends into the gap between the rubber frame and the fourth sub-substrate. The first buffer portion is disposed in the gap between the second sub-substrate and the rubber frame.

Optionally, the first sub-display screen includes a first upper polarizer. The second sub-display screen includes a second upper polarizer. The thickness of the first upper polarizer is greater than the thickness of the second upper polarizer. The thickness difference between the first upper polarizer and the second upper polarizer is proportional to the thickness of the first joining portion.

Optionally, the thickness of the first sub-substrate is greater than the thickness of the third sub-substrate, and the thickness difference between the first sub-substrate and the third sub-substrate is proportional to the thickness of the first joining portion.

The present application further discloses a display device including an assembling bracket. The display device further includes the above-mentioned assembled screen, and the assembled screen is assembled by the assembling bracket to form the display device.

This application improves the sub-display screen. By arranging an assembling piece in the seam region of the sub-display screen, a part of the assembling piece is used to seal the gap between the display panel and the fixing piece, so that a seal for the gap inside the sub-display screen is formed first. Then the part of the assembling piece protruding from the display panel is used to form a joining portion. When two adjacent sub-display screens are assembled together, the joining portion seals the seam region. This can effectively prevent external dust from entering the interior of the sub-display screen from the seam region, avoid dust from contaminating the electronic devices inside the sub-display screen, improve the joint sealing degree between the sub-display screens, and further improve the quality of the sub-display screen.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

Figure 1:
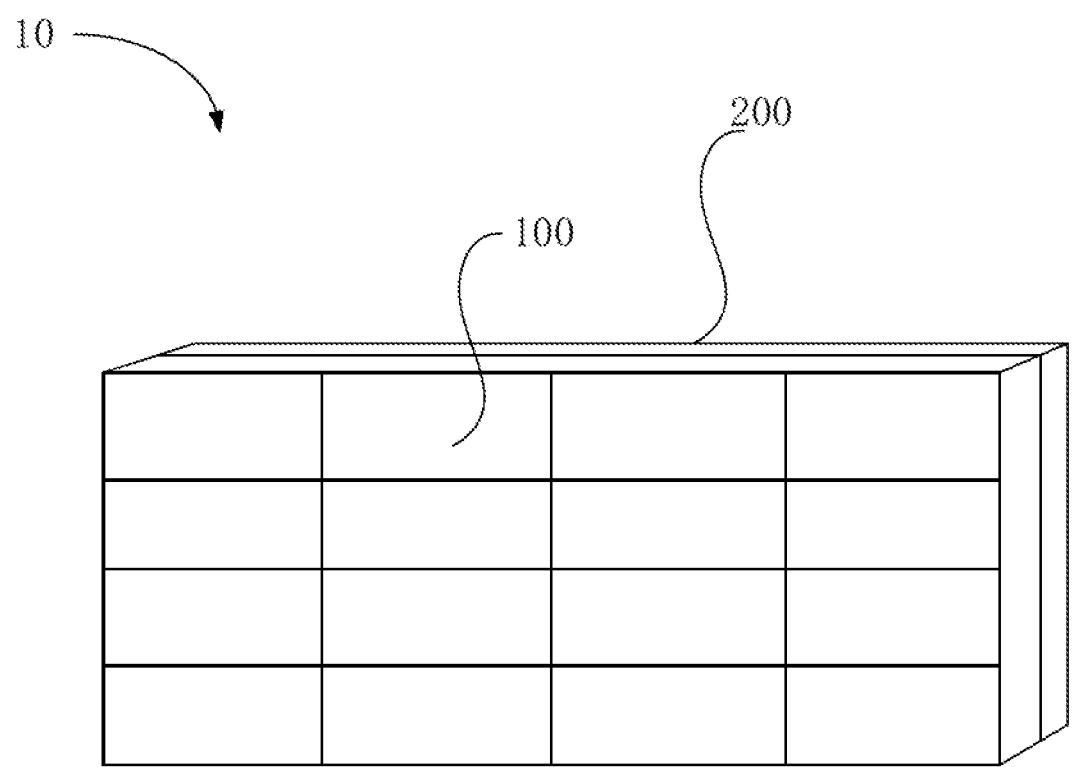
FIG. 1 is a schematic diagram of an embodiment of a display device of the present application.

In the drawings: 10, display device; 100, assembled screen; 110, sub-display screen; 111, first sub-display screen; 112, first sub-substrate; 113, second sub-substrate; 114, first protruding portion; 115, first upper polarizer; 120, second sub-display screen; 121, third sub-substrate; 122, fourth sub-substrate; 123, second protruding portion; 124, second upper polarizer; 130, display panel; 131, first substrate; 132, protruding portion; 133, chamfer; 134, light-shielding layer; 140, second substrate; 150, rubber frame; 160, back plate; 170, seam region; 180, assembling piece; 181, buffer portion; 182, support portion; 183, joining portion; 184, first buffer portion; 185, second buffer portion; 186, first support portion; 187, first joining portion; 200, assembling bracket; 300, fixing piece.

DETAILED DESCRIPTION OF EMBODIMENTS

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. Terms "multiple", "a plurality of", and the like mean two or more. Term "comprising", "including", and any variants thereof mean non-exclusive inclusion, so that one or more other features, integers, steps, operations, units, components, and/or combinations thereof may be present or added.

In addition, terms "center", "transverse", "up", "down", "left", "right", "vertical", "horizontal", "top", "bottom", "inside", "outside", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure.

Furthermore, as used herein, terms "installed on", "mounted on", "connected to", "coupled to", "connected with", and "coupled with" should be understood in a broad sense unless otherwise specified and defined. For example, they may indicate a fixed connection, a detachable connection, or an integral connection. They may denote a mechanical connection, or an electrical connection. They may denote a direct connection, a connection through an intermediate, or an internal connection between two elements. For those of ordinary skill in the art, the specific meanings of the above terms as used in the present application can be understood depending on specific contexts.

Hereinafter this application will be described in further detail with reference to the accompanying drawings and some optional embodiments.

FIG. 1 is a schematic diagram of an embodiment of a display device of the present application. As shown in FIG. 1, the present application discloses a display device 10, including an assembling bracket 200. The display device 10 further includes an assembled screen 100, and the assembled screen 100 is assembled through the assembling bracket 200 to form the display device 10.

An assembled screen usually includes a plurality of sub-display screens. The display device 10 of the present application is formed by assembling together a plurality of sub-display screens to form an assembled screen with a larger display area, which can display more picture area and have a wider viewing angle.

In addition, the sealing effect at the seam between the adjacent two sub-display screens in the assembled screen 100 of the present application is good, the sealing is convenient, and it is not easy to be invaded by external dust and water vapor during long-term use. The normal display effect of the display device 10 can be effectively guaranteed, the quality of the display device 10 can be improved, and the service life of the display device 10 can be prolonged.

In order to achieve the above effects, the present application mainly improves both the assembled screen 100 and the sub-display screen in the display device 10, and the specific improvements are as follows.

Figure 2:
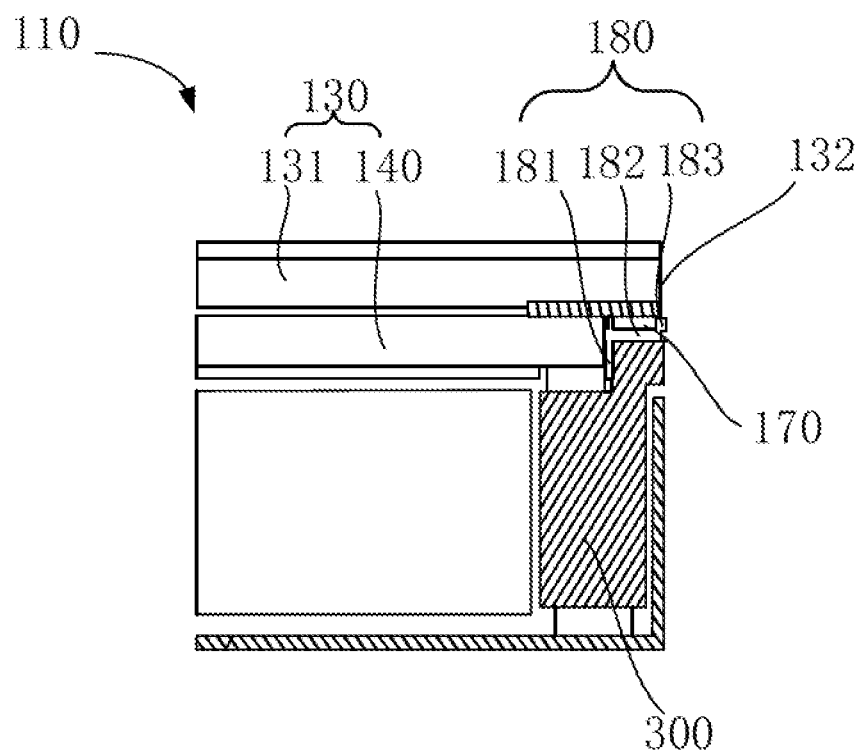
FIG. 2 is a partial schematic view of a joining side of a first embodiment of a sub-display screen of the present application.
Figure 3:
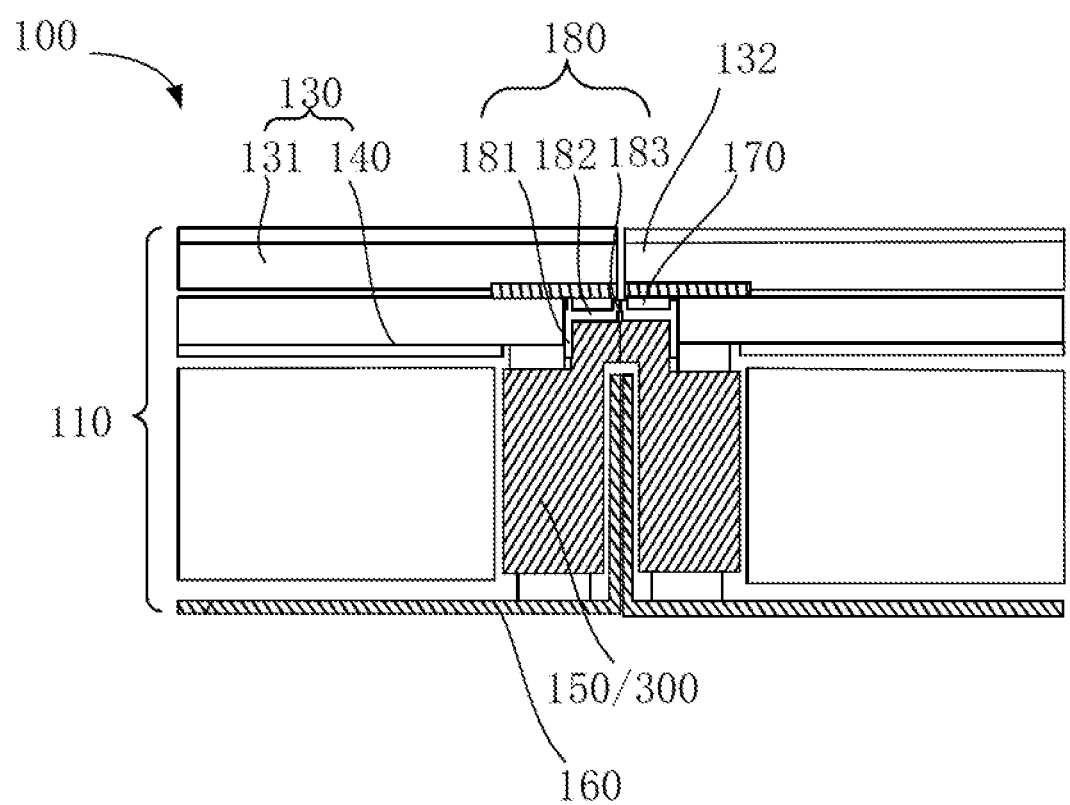
FIG. 3 is a partial schematic diagram illustrating a configuration after assembling of the first embodiment of the sub-display screen of the present application.

FIG. 2 is a partial schematic view of a joining side of a first embodiment of a sub-display screen of the present application. FIG. 3 is a partial schematic diagram after assembling of the first embodiment of the sub-display screen of the present application. As shown in FIG. 2 and FIG. 3, the present application discloses a sub-display screen 110, comprising a display panel 130 and a fixing piece 300. The fixing piece 300 is disposed below the display panel 130 for supporting the display panel 130. A seam region 170 is formed between the fixing piece 300 and the display panel 130. The sub-display screen 110 further includes an assembling piece 180. The assembling piece 180 is arranged in the seam region 170. A part of the assembling piece 180 is connected to the display panel 130 and the fixing piece 300, and seals the gap between the display panel 130 and the fixing piece 300. The other part protrudes from the side of the fixing piece 300 away from the display panel 130 to form a joining portion 183. After the two adjacent sub-display screens 110 are assembled together, the joining portion 183 seals the seam region 170.

This application improves the sub-display screen 110. By arranging the assembling piece 180 in the seam region 170 of the sub-display screen 110, a part of the assembling piece 180 is used to seal the gap between the display panel 130 and the fixing piece 300, so that a seal for the gap inside the sub-display screen 110 is formed first. The part of the assembling piece 180 protruding from the display panel 130 is then used to form the joining portion 183. After the two adjacent sub-display screens 110 are assembled together, the joining portion 183 seals the seam region 170, which can effectively prevent external dust from entering the interior of the sub-display screen 110 from the seam region 170, so as to prevent dust from contaminating the electronic devices inside the sub-display screen 110, improve the joint sealing degree between the sub-display screens 110, thus further improving the quality of the sub-display screens 110.

When the assembling piece 180 is made of a light-shielding material, it can also play a light-shielding effect to avoid light leakage from the sides of the display panel 130.

A typical display screen has a support structure such as a back plate and a rubber frame. The rubber frame is used to support the display panel to form a stable structure, and the back plate is used to wrap up the rubber frame and the display panel to avoid damage to the devices inside the display screen. The sub-display screen of the present application is suitable for the structure with a back plate and a rubber frame, and also for a structure with only a back plate where the rubber frame design is cancelled. This application only takes a display screen with a rubber frame and a back plate structure as an example for illustration.

Specifically, as shown in FIG. 2, the display panel 130 includes a first substrate 131 and a second substrate 140. The first substrate 131 and the second substrate 140 are aligned and bonded to form a cell. A portion of the first substrate 131 protrudes from or extends beyond the second substrate 140 to form a protruding portion 132. The fixing piece 300 includes a rubber frame 150. The assembling piece 180 includes a buffer portion 181 and a support portion 182. One end of the support portion 182 is connected with the buffer portion 181, and the other end is connected with the joining portion 183. The buffer portion 181 is perpendicular to the support portion 182. The support portion 182 is disposed between the protruding portion 132 and the rubber frame 150. The side of the support portion 182 away from the protruding portion 132 is connected to the rubber frame 150. One end of the buffer portion 181 abuts on the protruding portion 132, and the other end extends into the gap between the second substrate 140 and the rubber frame 150 and seals the gap. The joining portions 183 of two adjacent sub-display screens 110 are correspondingly arranged. After two adjacent sub-display screens 110 are assembled together, the joining portions 183 of the two sub-display screens 110 abut each other.

Figure 4:
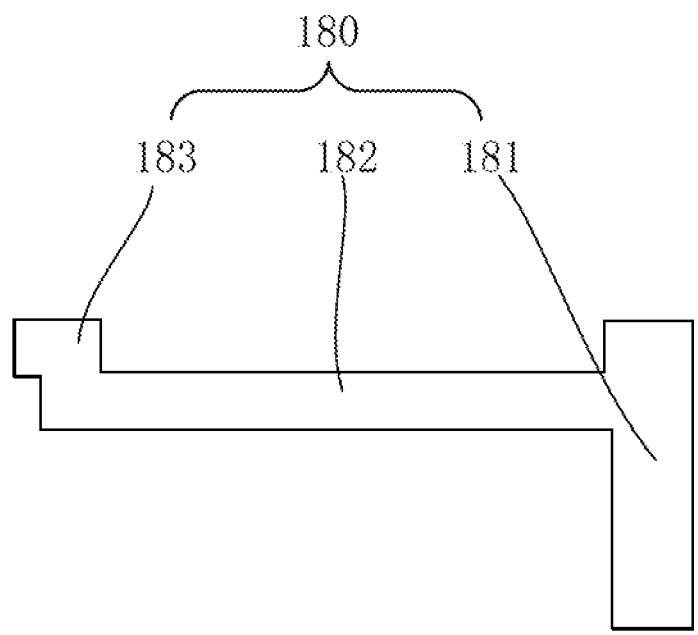
FIG. 4 is a schematic diagram of the first embodiment of the assembling piece of the application.

FIG. 4 is a schematic diagram of a first embodiment of the assembling piece of the present application. As shown in FIG. 3 in conjunction with FIG. 4, in this embodiment, the assembling piece 180 has three parts: a buffer portion 181, a support portion 182 and a joining portion 183, which form a shape similar to the number "4". The support portion 182 and the rubber frame 150 can be connected by means of glue, so that the assembling piece 180 can be better fixed to the rubber frame 150. After the support portion 182 is fixed, one end of the buffer portion 181 is inserted into the gap between the side surface of the second substrate 140 and the rubber frame 150, so that one end of the buffer portion 181 first fills the gap between the second substrate 140 and the rubber frame 150. The second substrate 140 and the rubber frame 150 are connected by the buffer portion 181, which eliminates the influence of the gap, makes it difficult for the second substrate 140 and the rubber frame 150 to shake, and avoids the occurrence of abnormal noise caused by the shaking between the second substrate 140 and the rubber frame 150. The buffer portion 181 also forms a seal for the gap between the second substrate 140 and the rubber frame 150 to prevent the dust remaining in the seam region 170 from invading into the assembled screen 100 through the gap between the second substrate 140 and the rubber frame 150 such that the electronic devices inside the assembled screen 100 are affected by dust, resulting in abnormal display of the assembled screen 100. In addition, the other end of the buffer portion 181 abuts on the protruding portion 132 of the first substrate 131. After the sub-display screen 110 is acted by an external force, the acting force on the first substrate 131 will be transferred to the buffer portion 181, and the acting force can be released by the buffer portion 181, which can also play a buffer role between the substrates.

The joining portion 183 protrudes from the back plate 160, which makes the joining portions 183 of the two sub-display screens 110 contact together first when two adjacent sub-display screens 110 are assembled together. After the assembling is completed, the joining portions 183 of the two sub-display screens 110 are pressed against each other to form an interference fit without leaving a gap. In this way, external dust or water vapor is prevented from entering the display screen from the seam between the two sub-display screens 110 and the gap between the back plate 160 and the rubber frame 150, which effectively prevents the inside of the display screen from getting dirty, or the electronic devices from being affected by dust and moisture. The joint sealing degree between the assembled screens 100 is greatly improved, and the quality of the assembled screens 100 is improved. When the assembling piece 180 is made of a black light-shielding material, it can also block the light leaking from the sides of the display panel 130, which effectively solves the problem of light leaking from the sides of the display panel 130.

The assembling piece 180 of the present application can also be made of highly elastic polymer materials, such as silicone, rubber, PU, EPE, foamed PET, black foam, etc. The assembling piece 180 made of any one of these materials can not only seal the gap between the display panel 130 and the rubber frame 150 in the sub-display screen 110, as well as the seam region 170 after the sub-display screens 110 are assembled, but also can also buffer between the display panel 130 and the rubber frame 150, and can further shield the sides of the display panel 130 from leaking light.

When the display panel 130 in the sub-display screen 110 is subjected to an external force, the force will be conducted between the display panel 130 and the rubber frame 150. If the connection between the display panel 130 and the rubber frame 150 is not buffered, it is easy to shake, and long-term shaking may cause light leakage or damage to the display panel 130. Therefore, when the assembling piece 180 is made of a high-elastic polymer material, such as rubber, one end of the elastic buffer portion 181 extends into the gap between the second substrate 140 and the rubber frame 150, which can play a better elastic buffering effect.

Figure 5:
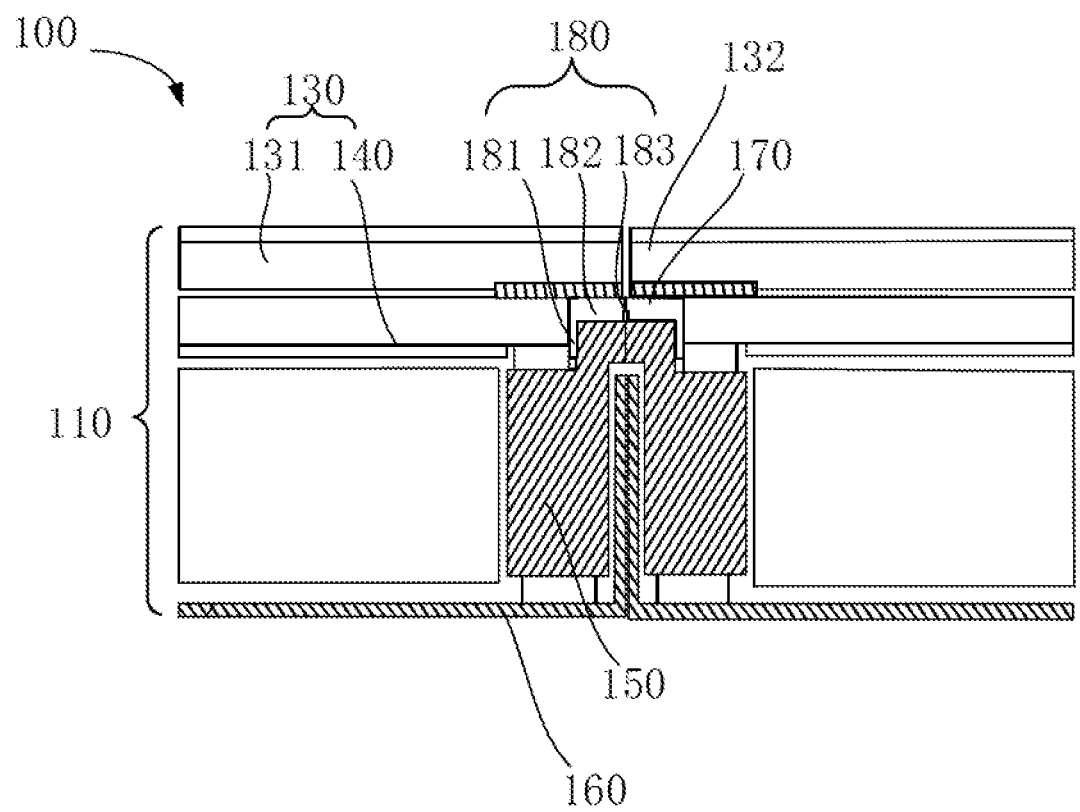
FIG. 5 is a partial schematic diagram after assembling of a second embodiment of a sub-display screen of the present application.
Figure 6:
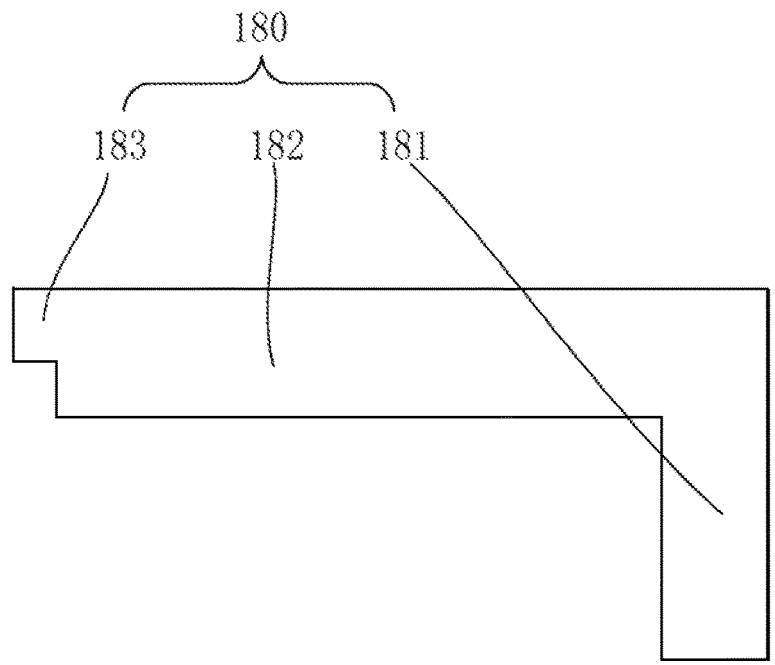
FIG. 6 is a schematic diagram of the second embodiment of the assembling piece of the application.

FIG. 5 is a partial schematic diagram illustrating the configuration after assembling of a second embodiment of the sub-display screens of the present application. FIG. 6 is a schematic diagram of the second embodiment of an assembling piece of the present application. As shown in FIG. 5 in conjunction with FIG. 6, this embodiment is an improvement based on FIG. 2. In particular, the side of the support portion 182 away from the rubber frame 150 abuts against the protruding portion 132. The side of the support portion 182 adjacent to the protruding portion 132, the side of the buffer portion 181 abutting the protruding portion 132, and the side of the joining portion 183 away from the back plate 160 lie on the same plane.

Different from the embodiment shown in FIG. 2, in this embodiment, both sides of the support portion 182 are respectively connected to the protruding portion 132 of the first substrate 131 and the rubber frame 150. The thickness of the support portion 182 is equal to the length of the buffer portion 181 extending beyond the gap between the second substrate 140 and the rubber frame 150. That is, the support portion 182 is located between the buffer portion 181 and the joining portion 183, and completely fills the gap between the protruding portion 132 of the first substrate 131 and the rubber frame 150. In this way, the support portion 182 forms a support between the first substrate 131 and the rubber frame 150, so that the first substrate 131 is not easily shaken, and the overall structural stability of the sub-display screen 110 is improved.

In addition, after the support portion 182 fills the gap between the protruding portion 132 of the first substrate 131 and the rubber frame 150, it fully abuts between the first substrate 131 and the rubber frame 150, which further improves the sealing degree of the sub-display screen 110 in the seam region 170, and there will be no dust or moisture remaining between the protruding portion 132 and the rubber frame 150. Furthermore, dust or moisture coming from the outside or from the seam between the two sub-display screens 110 will not intrude into the interior of the assembled screen 100, which improves the quality of the assembled screen 100.

Figure 7:
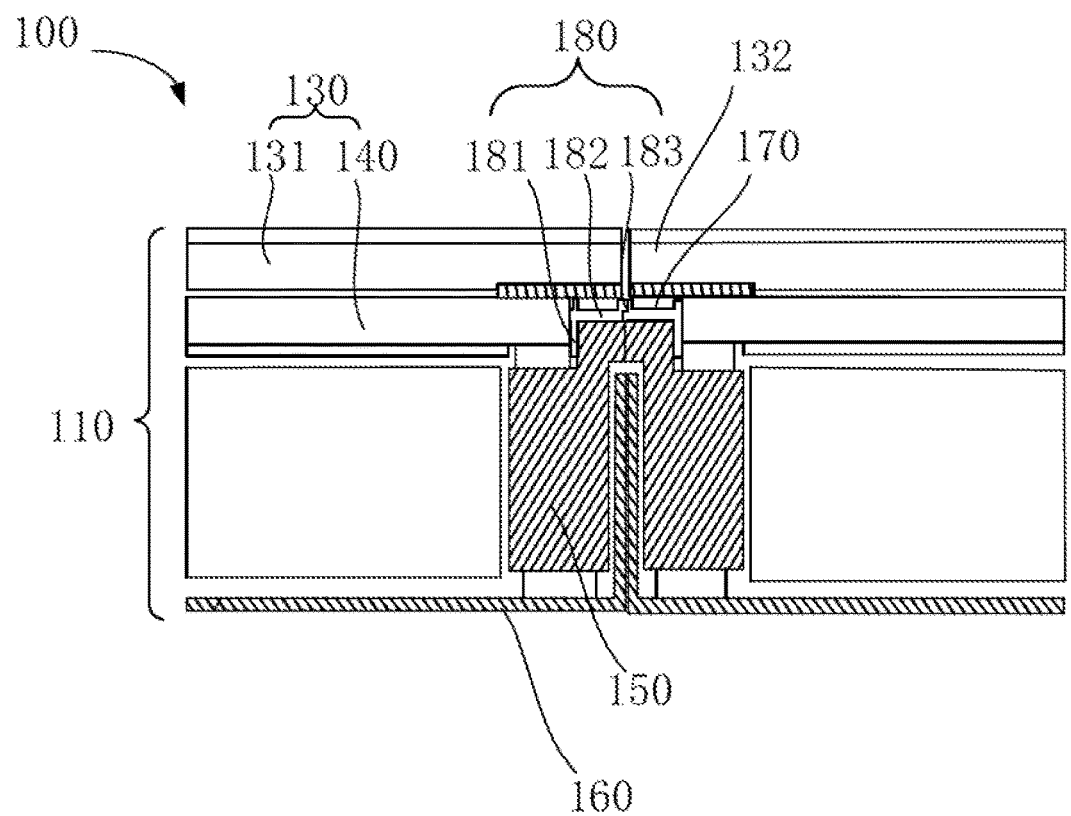
FIG. 7 is a partial schematic diagram illustrating a configuration after assembling of a third embodiment of a sub-display screen of the present application.
Figure 8:
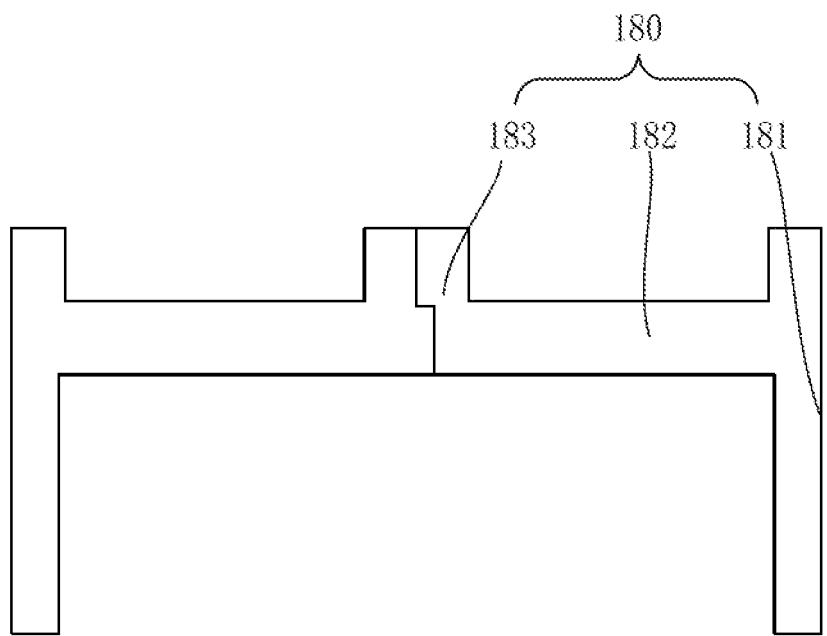
FIG. 8 is a schematic diagram illustrating a configuration after assembling of the third embodiment of the assembling piece of the application.

FIG. 7 is a partial schematic diagram illustrating a configuration after assembling of a third embodiment of the sub-display screen of the present application. FIG. 8 is a schematic diagram illustrating a configuration after assembling of the third embodiment of the assembling piece of the application. The embodiment shown in FIG. 7 in conjunction with FIG. 8 is an improvement based on FIG. 2 in that the joining portions 183 of two adjacent sub-display screens 110 are misaligned or staggered. After two adjacent sub-display screens 110 are assembled together, the joining portions 183 in the two adjacent sub-display screens 110 are engaged or interlocked with each other.

The difference between this embodiment and the embodiment shown in FIG. 2 is that the position of the joining portion 183 is improved in this embodiment. In this embodiment, the joining portions 183 of the two adjacent sub-display screens 110 are no longer correspondingly or oppositely arranged, but are misaligned or staggered. For example, the joining portion 183 of one of the sub-display screens 110 is in a upright "L" shape, and the joining portion 183 of the other sub-display screen 110 is an inverted "L" shape. When the two adjacent sub-display screens 110 are assembled, the two joining portions 183 abut each other to form a snapping or interlocking shape, which further improves the sealing degree between the two joining portions 183. In this way, it is more difficult for external dust or water vapor to pass through the gap between the two joining portions 183 from the seam and enter the gap between the back plate 160 and the rubber frame 150 causing the internal components to be dirty and making not easy to clean up. The sealing degree of the two sub-display screens 110 at the seam after assembling is improved, and the quality of the assembled screen is improved.

Figure 9:
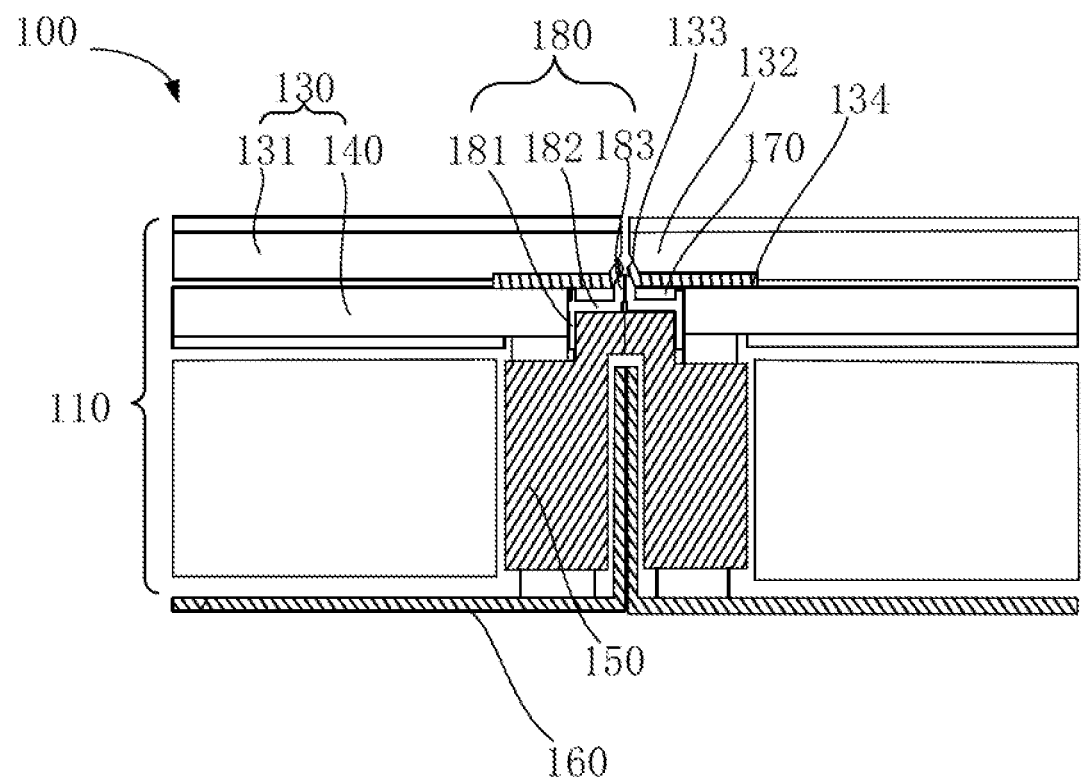
FIG. 9 is a partial schematic diagram illustrating a configuration after assembling of a fourth embodiment of a sub-display screen of the present application.
Figure 10:
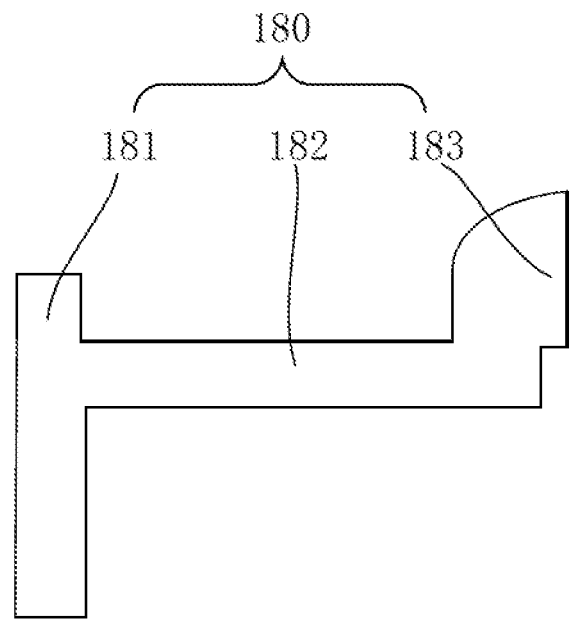
FIG. 10 is a schematic diagram of the fourth embodiment of the assembling piece of the application.

FIG. 9 is a partial schematic diagram illustrating a configuration after assembling of a fourth embodiment of the sub-display screen of the present application. FIG. 10 is a schematic diagram of a fourth embodiment of the assembling piece of the application. The embodiment shown in FIG. 9 in conjunction with FIG. 10 is an improvement based on FIG. 2. Between the first substrate 131 and the second substrate 140, a light shielding layer 134 is provided on the side adjacent to the protruding portion 132. A chamfer 133 is provided on one side of the protruding portion 132 adjacent to the joining portion 183. The light-shielding layer 134 is arranged to cover the chamfer 133. The joining portion 183 matches the shape of the chamfer 133, and the joining portion 183 abuts against the chamfer 133.

The light shielding layer 134 in this embodiment can be formed by applying black resin for shielding or attaching a black tape. By creating the chamfer 133 on the side of the protruding portion 132 of the first substrate 131 adjacent to the joining portion 183, the contact area between the protruding portion 132 and the joining portion 183 is increased, so that the joining portion 183 can better abut against the protruding portion 132 in order to achieve a better sealing effect, and it can also shield the side light of the display panel 130. When two adjacent sub-display screens 110 are assembled, the joining portions 183 of the two sub-display screens 110 not only form a seal between the joining portion 183 and the other joining portion 183 thus preventing external dust or water vapor from entering the gap between the back plate 160 and the rubber frame 150, but also forms a seal between the rubber frame 150 and the first substrate 131 to prevent external dust or moisture from entering the interior of the assembled screen 100 from the gap between the first substrate 131 and the joining portion 183. In this way, the seal is formed from two directions at the same time, which further enhances the seam sealing effect of the assembled screen 100 and improves the quality of the assembled screen 100.

Figure 11:
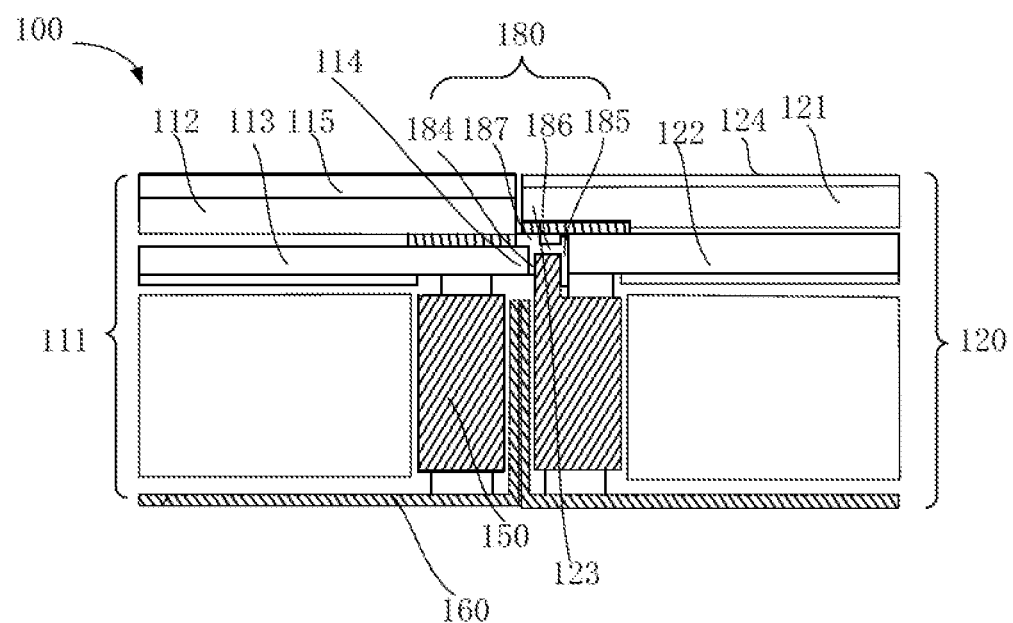
FIG. 11 is a partial schematic diagram of an embodiment of an assembled screen of the application.
Figure 12:
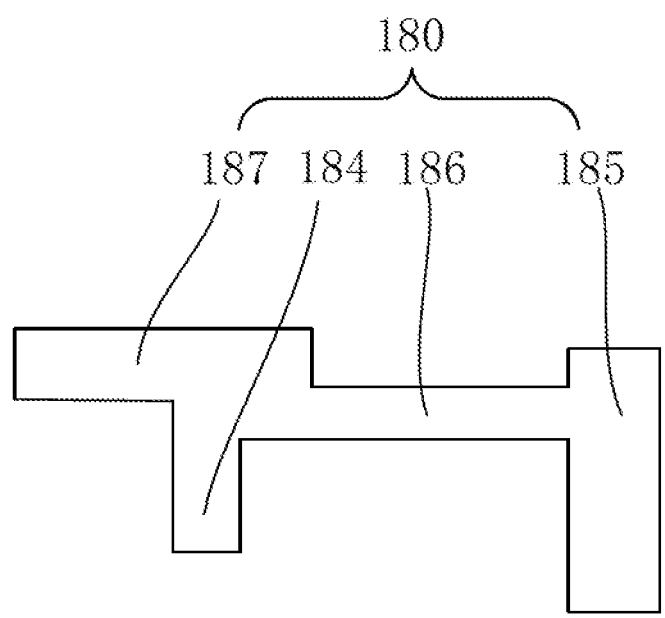
FIG. 12 is a schematic diagram of a fifth embodiment of an assembling piece of the present application.

FIG. 11 is a partial schematic diagram of an embodiment of an assembled screen of the present application. FIG. 12 is a schematic diagram of a fifth embodiment of the assembling piece of the application. As shown in FIG. 11 in conjunction with FIG. 12, the present application further discloses an assembled screen 100. The assembled screen 100 includes a plurality of sub-display screens 110 in the above-mentioned embodiments. The assembled screen 100 includes a first sub-display screen 111 and a second sub-display screen 120. The first sub-display screen 111 includes a first sub-substrate 112 and a second sub-substrate 113. The first sub-substrate 112 is disposed above the second sub-substrate 113. The second sub-display screen 120 includes a third sub-substrate 121 and a fourth sub-substrate 122. The third sub-substrate 121 is disposed above the fourth sub-substrate 122. The second sub-substrate 113 partially protrudes from the first sub-substrate 112 to form a first protruding portion 114. The third sub-substrate 121 partially protrudes from the fourth sub-substrate 122 to form a second protruding portion 123. After the first sub-display screen 111 and the second sub-display screen 120 are assembled, the orthographic projections of the first protruding portion 114 and the second protruding portion 123 in the direction perpendicular to the second sub-display screen 120 overlap. The assembling piece 180 includes a first buffer portion 184, a second buffer portion 185, a first support portion 186 and a first joining portion 187. The first buffer portion 184 and the second buffer portion 185 are respectively disposed at both ends of the first support portion 186 and are perpendicular to the first support portion 186. The first joining portion 187 is disposed between the first support portion 186 and the third sub-substrate 121. The first joining portion 187 is connected to both the second sub-substrate 113 and the third sub-substrate 121. One end of the second buffer portion 185 is abuts against the third sub-substrate 121, and the other end extends into the gap between the rubber frame 150 and the fourth sub-substrate 121. The first buffer portion 184 is disposed in the gap between the second sub-substrate 113 and the rubber frame 150.

The difference between this embodiment and the above-mentioned embodiments is that in this embodiment, the assembling piece 180 includes four parts: a first buffer portion 184, a second buffer portion 185, a first support portion 186 and a first joining portion 187. Furthermore, the substrates of two adjacent sub-display screens 110 that are assembled are improved, where the length of the second sub-substrate 113 in the first sub-display screen 111 is made to protrude from the first sub-substrate 112. That is, the length of the lower substrate of the first sub-display screen 111 is longer than the length of the upper substrate of the first sub-display screen 111. The length of the third sub-substrate 121 in the second sub-display screen 120 is made to protrude from the fourth sub-substrate 122, that is, the length of the lower substrate of the second sub-display screen 120 is shorter than the length of the upper substrate. After the first sub-display screen 111 and the second sub-display screen 120 are assembled, the lower substrate of the first sub-display screen 111 can extend into the gap between the lower substrate and the upper substrate of the second sub-display screen 120. At this time, the first support portion 186 is connected with the glue frame 150 of the second sub-display screen 120 by means of glue. At the same time, the first buffer portion 184 is extended into the gap between the second sub-substrate 113 and the rubber frame 150 to form a seal between the second sub-substrate 113 and the rubber frame 150. The second buffer portion 185 is extended into the gap between the fourth sub-substrate 122 and the rubber frame 150 to form a seal between the fourth sub-substrate 122 and the rubber frame 150. The first joining portion 187 is connected between the second sub-substrate 113 and the third sub-substrate 121 by means of glue or adhesive, so as to form a seal for the seam between the two sub-display screens 110.

In this way, only one assembling piece 180 can be used to connect the two sub-display screens 110 assembled to each other. One assembling piece 180 is used to seal the gap between the two sub-display screens 110 assembled to each other, so as to prevent external dust or water vapor from entering the interior of the display screen from the seam between the two sub-display screens 110, thereby effectively preventing the phenomenon of dust accumulation inside the display screen. While improving the sealing degree of the seam of the assembled screen 100, materials are also saved. When assembling, the multiple sub-assembled screens 100 can be assembled from the upper left to the lower right, which reduces the assembling process and improves the assembling efficiency.

On the premise that the distance from the first sub-substrate 112 of the first sub-display screen 111 to the support surface between the rubber frame 150 and the second sub-substrate 113 is equal to the distance from the third sub-substrate 121 of the second sub-display screen 120 to the support surface between the rubber frame 150 and the fourth sub-substrate 122, in order to realize the structure of FIG. 6, that is, the second substrate 140 extends into the gap between the fourth sub-substrate 122 and the third sub-substrate 121, it is necessary to adjust the thickness of each layer, and it is feasible to adjust the thickness of the polarizers or the substrate, as follows.

The first sub-display screen 111 includes a first upper polarizer 115. The second sub-display screen 120 includes a second upper polarizer 124. The thickness of the first upper polarizer 115 is greater than that of the second upper polarizer 124, and the thickness difference between the first upper polarizer 115 and the second upper polarizer 124 is proportional to the thickness of the first joining portion 187. In this way, the surface of the assembled screen 100 can be kept flat. In order to avoid the difference in brightness or color in the light-emitting display effect of the polarizers with different thicknesses, the backlight can be appropriately adjusted brighter or the panel color signal can be adjusted appropriately corresponding to the first sub-display screen 111 with the thick polarizer.

Of course, the thicknesses of the first sub-substrate 112 and the third sub-substrate 121 can alternatively be improved. The thickness of the first sub-substrate 112 may be made greater than that of the third sub-substrate 121. The thickness difference between the first sub-substrate 112 and the third sub-substrate 121 may be proportional to the thickness of the first joining portion 187. The above effects can also be achieved, which will not be repeated here.

It should be noted that the inventive concept of the present application can be formed into many embodiments, but the length of the application document is limited and so these embodiments cannot be enumerated one by one. The technical features can be arbitrarily combined to form a new embodiment, and the original technical effect may be enhanced after the various embodiments or technical features are combined.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, which shall all be regarded as falling in the scope of protection of this application.

What is claimed is:

1. A sub-display screen, comprising: a display panel; a fixing piece, disposed below the display panel and configured to support the display panel, wherein a seam region is defined between the fixing piece and the display panel; and an assembling piece arranged in the seam region; wherein a portion of the assembling piece is connected to the display panel and the fixing piece, and seals a gap between the display panel and the fixing piece; wherein another portion of the assembling piece protrudes from a side of the fixing piece away from the display panel to form a joining portion, and wherein after two adjacent sub-display screens are assembled, the joining portions of the two adjacent sub-display screens seal the seam region, wherein the display panel comprises a first substrate and a second substrate that are aligned and bonded together to form a cell, wherein the first substrate partially protrudes from the second substrate to form a protruding portion; the fixing piece comprises a rubber frame; the assembling piece further comprises a buffer portion and a support portion; wherein one end of the support portion is connected with the buffer portion, another end of the support portion is connected with the joining portion, and wherein the buffer portion is perpendicular to the support portion; wherein the support portion is arranged between the protruding portion and the rubber frame, and a side of the support portion away from the protruding portion is connected to the rubber frame; wherein one end of the buffer portion abuts the protruding portion, and another end of the support portion extends into the gap between the second substrate and the rubber frame and seal the gap.

2. The sub-display screen of claim 1, wherein the joining portions of two adjacent sub-display screens are arranged correspondingly and oppositely, and after the two adjacent sub-display screens are assembled, the joining portions of the two sub-display screens abut against each other.

3. The sub-display screen of claim 2, wherein the buffer portion, the support portion, and the joining portion of each assembling piece are arranged to jointly form a shape of number "4".

4. The sub-display screen of claim 3, wherein the joining portions of the two adjacent sub-display screens are connected to each other by an interference fit.

5. The sub-display screen of claim 1, wherein the joining portions of two adjacent sub-display screens are misaligned, and after the two adjacent sub-display screens are assembled, the joining portions of the two adjacent sub-display screens are engaged with each other.

6. The sub-display screen of claim 5, wherein of the two adjacent sub-display screens, the joining portion of one of the two sub-display screens is disposed in an upright "L" shape, and the joining portion of the other of the two sub-display screens is disposed in an inverted "L" shape.

7. The sub-display screen of claim 1, wherein a side of the support portion away from the rubber frame abuts on the protruding portion; wherein a side of the support portion adjacent to the protruding portion, a side of the buffer portion abutting the protruding portion, and a side of the joining portion adjacent to the first substrate are coplanar.

8. The sub-display screen of claim 7, wherein two sides of the support portion are respectively connected to the corresponding protruding portion and rubber frame; and wherein a thickness of the support portion is equal to a length of buffer portion exposed from the gap between the corresponding second substrate and rubber frame.

9. The sub-display screen of claim 1, wherein a light shielding layer is disposed between the first substrate and the second substrate on a side adjacent to the protruding portion; wherein a chamfer is disposed on a side of the protruding portion adjacent to the joining portion, and the light-shielding layer is disposed to cover the chamfer; wherein the joining portion matches a shape of the chamfer, and the joining portion abuts against the chamfer.

10. The sub-display screen of claim 9, wherein the light shielding layer is made of black resin or black tape.

11. The sub-display screen of claim 1, wherein the splicing piece is made of a highly elastic polymer material.

12. The sub-display screen of claim 1, wherein the support portion and the rubber frame are connected together by a glue.

13. The sub-display screen of claim 1, wherein the assembling piece is made of a black light-shielding material.

* * * * *